United States Patent
Rank et al.

(10) Patent No.: US 9,200,682 B2
(45) Date of Patent: Dec. 1, 2015

(54) SYNCHRONIZATION UNIT FOR A POSITIVE DUAL CLUTCH

(75) Inventors: Robert Rank, Arnsberg (DE); Matthias Glomm, Iserlohn (DE); Christian Hampel, Unna (DE); Thomas Haeseker, Lauterhofen (DE)

(73) Assignee: GKN STROMAG AG, Unna (DE)

( * ) Notice: Subject to any disclaimer, the term of this patent is extended or adjusted under 35 U.S.C. 154(b) by 322 days.

(21) Appl. No.: 13/823,172

(22) PCT Filed: Aug. 18, 2011

(86) PCT No.: PCT/EP2011/064203
§ 371 (c)(1),
(2), (4) Date: May 15, 2013

(87) PCT Pub. No.: WO2012/034817
PCT Pub. Date: Mar. 22, 2012

(65) Prior Publication Data
US 2013/0233666 A1 Sep. 12, 2013

(30) Foreign Application Priority Data
Sep. 14, 2010 (DE) .......................... 10 2010 046 139

(51) Int. Cl.
*F16D 23/04* (2006.01)
*F16D 23/06* (2006.01)
(Continued)

(52) U.S. Cl.
CPC ................ *F16D 23/04* (2013.01); *F16D 23/06* (2013.01); *F16D 23/08* (2013.01); *F16D 2011/002* (2013.01); *F16D 2023/0618* (2013.01); *F16D 2023/0631* (2013.01); *F16D 2023/0637* (2013.01); *F16D 2023/0643* (2013.01)

(58) Field of Classification Search
CPC . F16D 23/06; F16D 2023/0643; F16D 23/04; F16D 23/0618; F16D 2023/0631; F16D 2011/002; F16D 2023/0637; F16D 23/08
USPC ............. 192/53.1, 53.3, 53.32, 53.34, 53.361
See application file for complete search history.

(56) References Cited

U.S. PATENT DOCUMENTS 4,185,725 A * 1/1980 Maina ........................ 192/53.31
4,413,715 A * 11/1983 Michael et al. ............ 192/53.31
(Continued)

FOREIGN PATENT DOCUMENTS

| CN | 1361028 A | 7/2002 |
|---|---|---|
| DE | 2 252 520 | 5/1974 |

(Continued)

OTHER PUBLICATIONS

Form PCT/ISA/220 Notification of Transmittal of International Search Report dated Oct. 12, 2011 (1 page).
(Continued)

*Primary Examiner* — Colby M Hansen
(74) *Attorney, Agent, or Firm* — Flynn, Thiel, Boutell & Tanis, P.C.

(57) ABSTRACT

A synchronization unit for a positive dual clutch. The synchronization unit has a sleeve carrier that is axially and rotationally fixed to an output shaft and a shifting sleeve that is rotationally fixed and axially displaceable relative to the sleeve carrier. The synchronization rings of a synchronization clutch on the sleeve carrier side and the sleeve carrier comprise axially interlocked circumferential segments.

8 Claims, 5 Drawing Sheets

(51) Int. Cl.
  *F16D 23/08*   (2006.01)
  *F16D 11/00*   (2006.01)

(56) References Cited

U.S. PATENT DOCUMENTS

| | | | |
|---|---|---|---|
| 4,830,159 | A | 5/1989 | Johnson et al. |
| 6,554,114 | B2 | 4/2003 | Lee |
| 2002/0084166 | A1 | 7/2002 | Lee |
| 2011/0277572 | A1 | 11/2011 | Schauer et al. |

FOREIGN PATENT DOCUMENTS

| | | |
|---|---|---|
| DE | 25 38 781 A1 | 3/1977 |
| DE | 32 08 945 A1 | 9/1983 |
| DE | 600 27 968 T2 | 12/2006 |
| DE | 10 2007 061 646 A1 | 7/2009 |
| EP | 1 162 380 A1 | 12/2001 |
| EP | 1 298 340 A1 | 4/2003 |
| EP | 1072811 B1 | 5/2006 |
| EP | 2 182 233 A1 | 5/2010 |
| FR | 2 818 339 A1 | 6/2002 |
| FR | 2 830 302 A1 | 4/2003 |
| GB | 615325 | 1/1949 |
| WO | WO 2008/007083 A1 | 1/2008 |

OTHER PUBLICATIONS

Form PCT/ISA/210 International Search Report dated Oct. 12, 2011 with English translation of categories of documents cited (6 pages).
Form PCT/ISA/237 Written Opinion of International Searching Authority dated Oct. 12, 2011 (6 pages).
Examination Report of German Patent Office issued in German Application No. 10 2010 046 139.3 dated Jun. 1, 2011 (5 pages).
English translation of Chinese Examination Report dated Jan. 23, 2015 and Chinese Search Report dated Jan. 13, 2015 issued in Application No. 201180054733.8 of the Chinese Patent Office (7 pages).

* cited by examiner

SYNCHRONIZATION UNIT FOR A POSITIVE DUAL CLUTCH

FIELD OF THE INVENTION

The invention relates to a synchronization unit for a positive dual clutch, in particular for a gearwheel mechanism, having a sleeve carrier which is connected axially and fixedly to a working shaft so as to rotate therewith, and having a selector sleeve which is fixed rotationally and can be displaced axially relative to the sleeve carrier. The synchronization unit also includes two frictionally acting synchronizer clutches which are assigned to opposite axial sides of the sleeve carrier and in each case one clutch gear, each synchronizer clutch having a multiple disk assembly, and having a plurality of pressure pieces which are arranged so as to be distributed over the circumference of the sleeve carrier and are mounted in an axially adjustable manner by way of the selector sleeve for loading one or the other synchronizer clutch.

BACKGROUND OF THE INVENTION

A synchronization unit of this type is known from DE 32 08 945 A1. The known synchronization unit is provided for a positive dual clutch of a gearwheel mechanism which is used, in particular, in the automotive field. The known synchronization unit has a working shaft which is designed as a gear mechanism shaft and on which the sleeve carrier is arranged in a rotationally and axially fixed manner. The sleeve carrier is surrounded in a rotationally fixed manner by a selector sleeve which can be moved axially relative to the sleeve carrier. In each case one clutch gear, which is fastened to a corresponding gearwheel of the gearwheel mechanism, is provided on opposite axial sides of the sleeve carrier. The sleeve carrier is assigned two axially movably mounted synchronizer rings of two synchronizer clutches which are arranged so as to lie opposite one another, which synchronizer rings can be displaced axially by pressure pieces which are mounted on the sleeve carrier. A multiple disk assembly is arranged between each synchronizer ring and the adjacent clutch gear, which multiple disk assembly is pressed together by corresponding axial pressure loading of the respective synchronizer ring and can thus transmit a torque, frictionally, to the clutch gear. The movement of the pressure piece is carried out by axial displacement of the selector sleeve which can be moved via a manual linkage or the like. After rotational speed equalization has been carried out between the synchronizer ring and the associated clutch gear, the selector sleeve is displaced to such an extent that a positive rotational drive can be achieved between the synchronizer ring and the clutch gear. For this purpose, the selector sleeve is provided with an inside axial toothing system. On the same pitch circle diameter, the clutch gear and the associated synchronizer ring have complementary external toothing systems which are likewise configured as axial toothing systems. The construction and function of the synchronizer clutch for the other axial side of the sleeve carrier corresponds in construction and function to that described above.

SUMMARY OF THE INVENTION

It is an object of the invention to provide a synchronization unit of the type mentioned at the outset, which synchronization unit has a reduced axial overall length in comparison with the prior art.

This object is achieved by virtue of the fact that sleeve-carrier-side synchronizer rings of the synchronizer clutch and the sleeve carrier have axially indented circumferential sections. As a result, the synchronizer rings and the sleeve carrier engage axially into one another, and the sleeve carrier and/or the synchronizer rings having complementary axial cutouts and/or axial projections. As a result of the solution according to the invention, the synchronizer rings and the sleeve carrier are nested axially inside one another, which results in a reduced axial overall length for this functional unit, in relation to a rotational axis of the working shaft. As a result, it is possible to design the entire synchronization unit with a reduced axial overall length. The solution according to the invention is suitable in a particularly advantageous way for gearwheel mechanisms of machines or of motor vehicles such as passenger vehicles, trucks or commercial vehicles.

In one refinement of the invention, the sleeve carrier is provided with a plurality of axial cutouts which are arranged so as to be distributed over its circumference and are open in an alternating manner toward opposite ends or sides of the sleeve carrier. The cutouts, which are arranged offset with respect to one another in the circumferential direction and are open toward opposite sides of the sleeve carrier, serve to receive both synchronizer rings from the respective opposite axial ends of the sleeve carrier.

In a further refinement of the invention, each synchronizer ring is provided with a number of external toothing sections which corresponds to the number of axial cutouts located on one end or side of the sleeve carrier, which toothing sections are fitted axially and radially into the cutouts. As a result of this refinement, the synchronizer ring does not have to be provided with an external toothing system over its entire circumference. Rather, it is sufficient to provide the axial external toothing system over a considerably reduced circumferential length which is adapted to the circumferential length of the cutouts of the sleeve carrier. As a result, the production of the synchronizer rings is simplified and is inexpensive. Each synchronizer ring preferably has a carrier ring, from which the external toothing sections project radially to the outside and, in the mounted state, protrude into the cutouts of the sleeve carrier. The circumferential length of the external toothing sections is smaller than the circumferential extent of the corresponding axial cutout of the sleeve carrier, in order to make a certain mobility of the synchronizer ring possible in the circumferential direction relative to the sleeve carrier. Accordingly, the external toothing sections are advantageously arranged in the associated cutouts with play in the circumferential direction.

In a further refinement of the invention, the selector sleeve has an axial inner toothing system which is complementary with respect to the external toothing sections and is recessed in sections in the region of the external toothing sections of each synchronizer ring and at the radial level of the cutouts of the sleeve carrier. This refinement is necessary in order to avoid a positive connection to the synchronizer rings in a neutral position of the selector sleeve. The mobility of the synchronizer rings would be impaired as a result.

In a further refinement of the invention, the recessed sections or regions of the selector sleeve are provided at opposite ends of the selector sleeve, in a complementary manner with respect to the cutouts of the sleeve carrier, such that the recessed sections alternate and are distributed over the circumference of the selector sleeve. This ensures, in the neutral position of the selector sleeve, that the selector sleeve is not positively connected to either of the two synchronizer rings. The sleeve carrier has its full or maximum axial length at areas circumferentially between the cutouts, which areas are provided continuously with an axial external toothing system.

In a further refinement of the invention, both the sleeve carrier and the selector sleeve, which is arranged on the sleeve carrier in a rotationally fixed and axially movable manner, have complementary axial toothing sections which extend over the entire axial length of the sleeve carrier and the selector sleeve, these axial toothing sections being provided, as viewed in the circumferential direction, between the cutouts of the sleeve carrier and the recessed regions of the internal toothing system of the selector sleeve. As a result, a large axial guide length between the sleeve carrier and the selector sleeve can be achieved, as a result of which tilting moments of the selector sleeve relative to the sleeve carrier are reduced.

In a further refinement of the invention, the pressure pieces are arranged axially adjacent to the cutouts, in which cutouts the toothing sections of the synchronizer rings are located, in the sleeve carrier. As a result, the pressure pieces can act directly axially on the synchronizer rings.

In a further refinement of the invention, the pressure pieces comprise ball elements which are loaded by a compression spring and interact with an inside circumferential groove of the selector sleeve, in order to ensure axial displaceability of the pressure pieces during an axial movement of the selector sleeve. In the neutral position of the selector sleeve and the pressure pieces, the inner circumferential groove of the selector sleeve and the ball elements of the pressure pieces engage into one another and remain operatively connected to one another even during the synchronization operation. In the case of a further axial displacement of the selector sleeve, in order to achieve a positive connection between the corresponding clutch elements of the dual clutch, the circumferential groove and the ball elements of the pressure pieces pass out of engagement with one another.

BRIEF DESCRIPTION OF THE DRAWINGS

Further advantages and features of the invention result from the claims and from the following description of one preferred exemplary embodiment of the invention which is shown by way of the drawings, in which:

DETAILED DESCRIPTION

Figure 1:
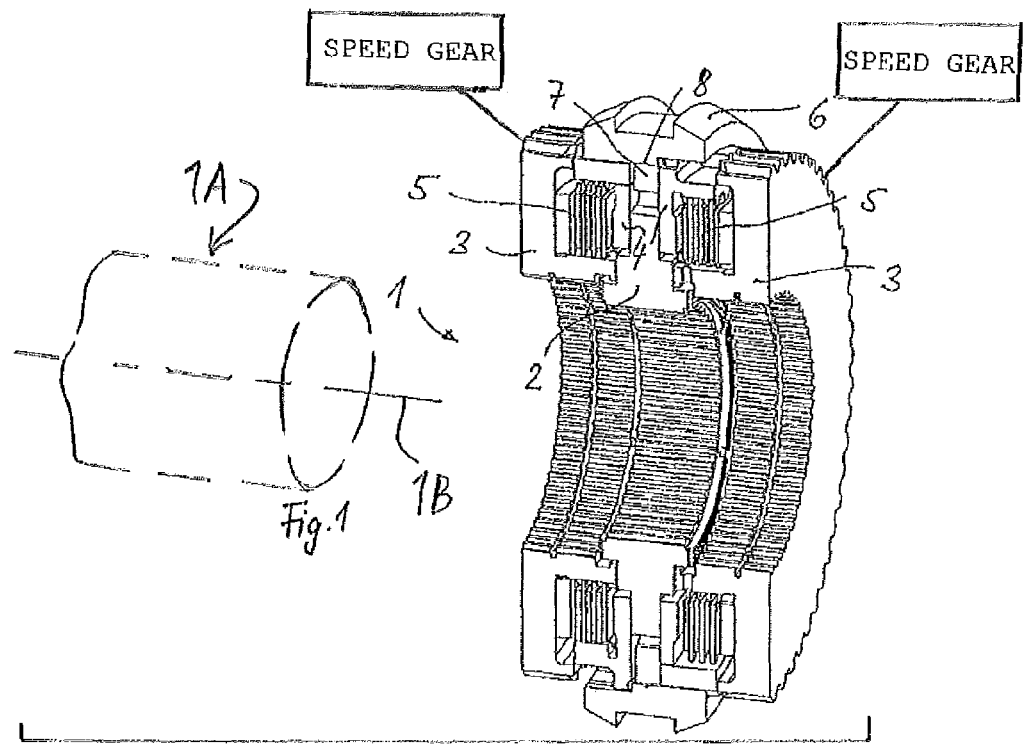
FIG. 1 shows a perspective, cut-away illustration of one embodiment of a synchronization unit according to the invention for a positive dual clutch.
Figure 2:
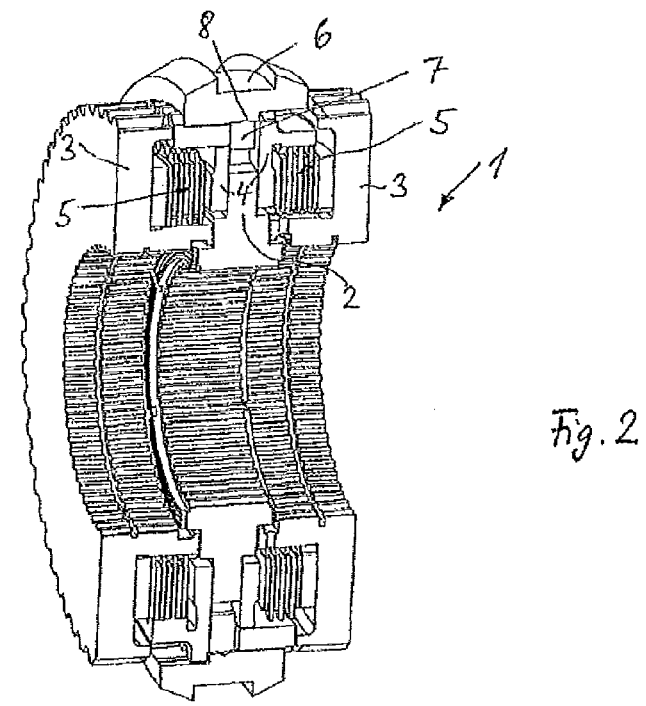
FIG. 2 shows the synchronization unit according to FIG. 1 from another perspective.

A positive dual clutch, details of which can be seen in FIGS. 1 and 2, is provided for a gearwheel mechanism of a motor vehicle and serves to shift to and fro between two coaxial, different speed gears of the gearwheel mechanism. The dual clutch has a synchronization unit 1 according to FIGS. 1 to 9 which, before a positive shifting operation between a gear mechanism or working shaft 1A defining a rotational axis 1B (shown in dotted lines in FIG. 1) and one of the two speed gears, performs a synchronization of the rotational speeds of the gear mechanism shaft 1A and the corresponding speed gear.

An annular sleeve carrier 2 is also fastened to the gear mechanism shaft 1A in a rotationally fixed and axially secured manner. The speed gears which are coaxial with respect to the gear mechanism shaft 1A are mounted on the gear mechanism shaft 1A in a rotationally movable manner. In each case one clutch gear 3 is connected to each speed gear (shown diagrammatically in FIG. 1) in an axially fixed manner so as to rotate with the speed gear. The two clutch gears 3 are arranged on opposite axial ends or sides of the sleeve carrier 2 and in each case are at the same axial spacing from the sleeve carrier 2. In order to synchronize the corresponding rotational speeds, each axial side of the sleeve carrier 2 is assigned a frictionally acting synchronizer clutch 5 in the form of a multiple disk clutch. Each synchronizer clutch 5 has an axially fixed clutch ring (not denoted in greater detail) in the region of the respective clutch gear 3 and an axially movable synchronizer ring 4 which bears directly against the sleeve carrier 2. Each multiple disk assembly is provided with a plurality of inner disks and with outer disks arranged between the inner disks, the inner disks being rotationally fixed to the respective clutch gear 3 and the outer disks being rotationally fixed to the adjacent synchronizer ring 4. Both the inner disks and the outer disks are arranged axially movably coaxially with respect to the rotational axis 1B of the gear mechanism shaft 1A and therefore also with respect to a rotational axis of the dual clutch. In order to mount the inner disks, each clutch gear 3 has a hub region which projects axially toward the sleeve carrier 2 and is provided with an axial external toothing system, on which the inner disks are held in a rotationally locking but axially displaceable manner. In order to hold the outer disks of each multiple disk assembly in a rotationally fixed manner, each of the two synchronizer rings 4 has toothing sections 11 which are provided with correspondingly designed, axial internal toothing systems 13. In addition, the toothing sections 11 are provided with axial external toothing systems 14 which are offset axially and radially to the outside in a stepped manner with respect to the internal toothing systems 13, the pitch circle diameters of which correspond to the pitch circle diameter of axial external toothing systems of the clutch gears 3 and the pitches of which are designed identically with respect to the axial external toothing system of the clutch gears 3.

In order for it to be possible to displace the synchronizer rings 4 axially for a corresponding actuation of the left-hand or right-hand multiple disk clutch, a total of six pressure pieces 7, which are held in the sleeve carrier 2 in a rotationally fixed and axially movable manner, are provided in a uniformly distributed manner over the circumference of the sleeve carrier 2. To this end, a total of six pressure piece cutouts 10 (FIGS. 6 and 9) are provided in the sleeve carrier 2. Each pressure piece 7 has a ball element 17 which is loaded by a compression spring and interacts positively with an inside circumferential groove 8 of a selector sleeve 6. The selector sleeve 6 is held on the sleeve carrier 2 so that the selector sleeve 6 rotates with, but is axially displaceable relative to, the sleeve carrier 2. In order to achieve this, the sleeve carrier 2 is provided with an axial external toothing system 2A, the pitch circle diameter and pitch of which correspond to the axial external toothing systems of the clutch gears 3 and of the toothing sections 11 of the synchronizer rings 4. In an annularly circumferential manner, the selector sleeve 6 has a complementary internal toothing system 15 which is designed as an axial toothing system like the external toothing system 2A of the sleeve carrier 2. An actuating linkage of the gearwheel mechanism acts on the outside of the selector sleeve 6 in a way which is known in principle and is therefore not shown in greater detail.

As can be seen using FIGS. 3 to 9, the sleeve carrier 2 is provided with a total of six axial cutouts 9 distributed over a circumference thereof, and three axial cutouts 9 are assigned to or are located at each axial end or side of the sleeve carrier 2. The three axial cutouts 9 located at each axial end of the sleeve carrier 2 are distributed uniformly over the circumference and accordingly have circumferential angles of 120° with respect to one another. Each of the axial cutouts 9 on one axial end of the sleeve carrier 2 is arranged on the circumference of the sleeve carrier 2 so as to be offset from each circumferentially adjacent cutout 9 located on the opposite axial end of the sleeve carrier 2 by half the circumferential distance between a pair of circumferentially adjacent cutouts 9 located on the one end or side of the sleeve carrier 2. The overall result is that the six axial cutouts 9 are arranged so as to be distributed over the circumference of the sleeve carrier 2 at circumferential angles of 60° relative to one another and in an alternating manner on the left-hand and right-hand side. In each case one axial cutout 9 is open toward the left-hand end or side of the sleeve carrier 2 and is followed in the circumferential direction by an axial cutout 9 which is open toward the right-hand side of the sleeve carrier 2, and this axial cutout 9 which opens toward the right-hand side is followed in the circumferential direction again by a cutout 9 which opens toward the left-hand side. The pressure piece cutout 10 is provided centrally at a location at half of the circumferential length of each axial cutout 9.

The axial cutouts 9 serve to axially receive the toothing sections 11 of the two synchronizer rings 4, one synchronizer ring 4 being assigned to the left-hand axial end of the sleeve carrier 2 and the other synchronizer ring 4 being assigned to the right-hand axial end of the sleeve carrier 2. Accordingly, each synchronizer ring 4 has three toothing sections 11 distributed uniformly over its circumference. Each synchronizer ring 4 is provided with a carrier ring 12, to the outer circumference of which the toothing sections 11 are fastened so as to all project axially towards the same axial end or side. In the exemplary embodiment which is shown, the toothing sections 11 are welded fixedly to the outer circumference of the carrier ring 12. In other embodiments (not shown), the toothing sections 11 are formed integrally on the carrier ring 12 or are fastened to the carrier ring with the aid of mechanical fastening means.

Figure 3:
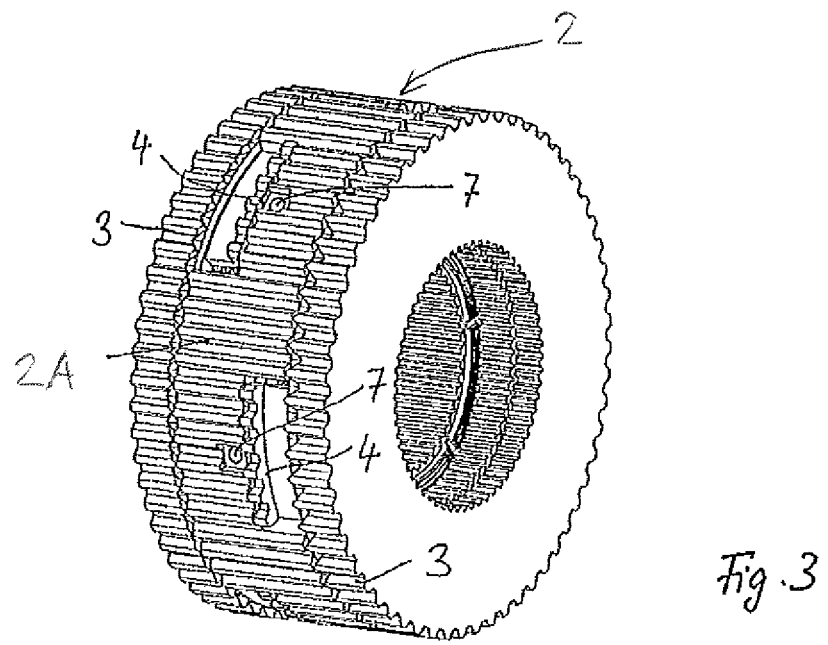
FIG. 3 shows the synchronization unit according to FIGS. 1 and 2 with the omission of an outer selector sleeve.
Figure 4:
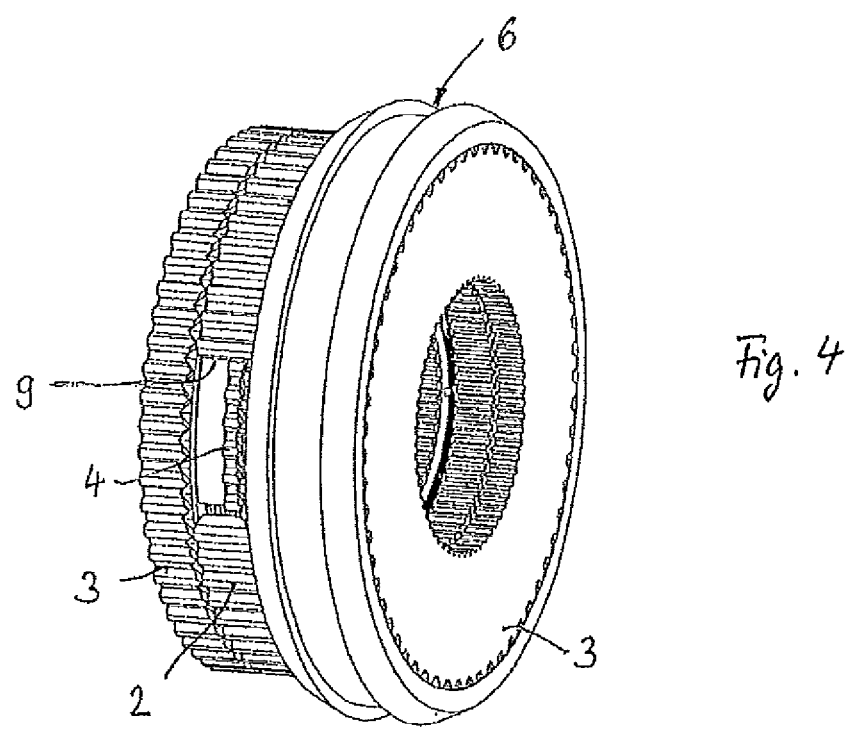
FIG. 4 shows the synchronization unit according to FIGS. 1 to 3 with a selector sleeve which is displaced into a positive shifting position.
Figure 5:
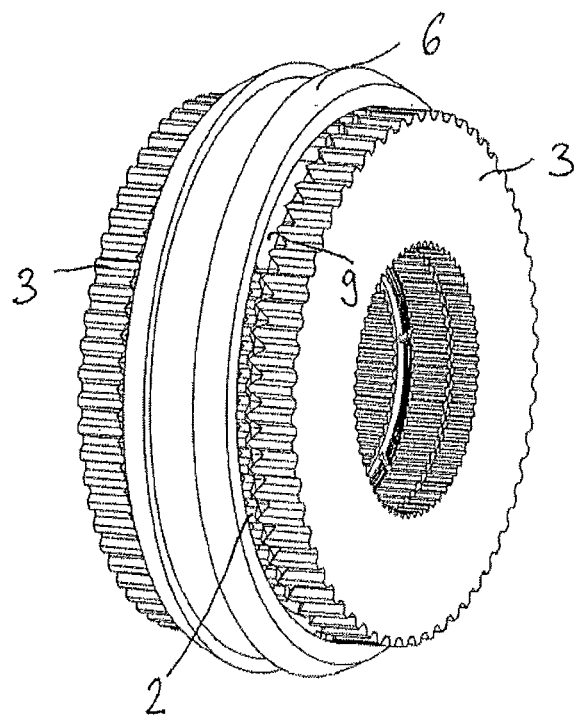
FIG. 5 shows the synchronization unit according to FIG. 4 with a selector sleeve which is situated in the neutral position.
Figure 6:
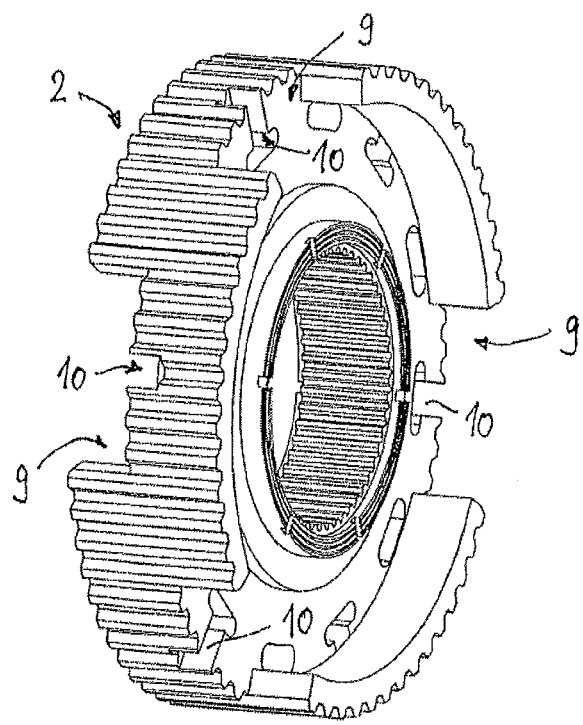
FIG. 6 shows a sleeve carrier of the synchronization unit according to FIGS. 1 to 5.
Figure 7:
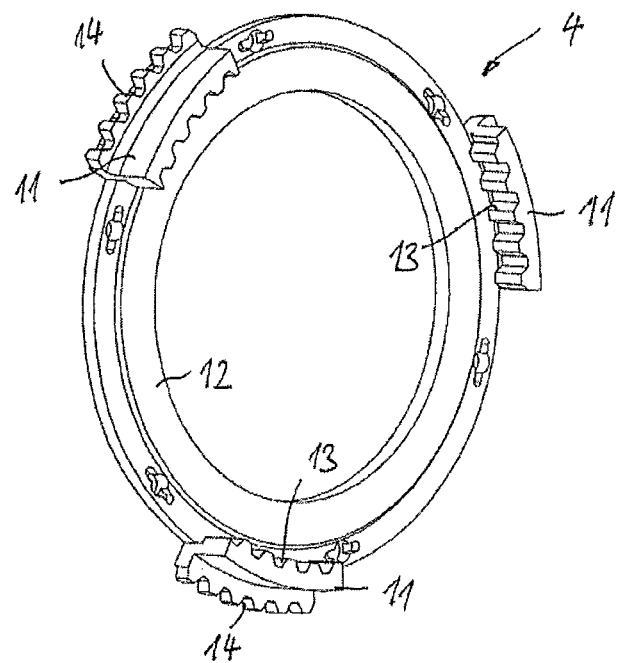
FIG. 7 shows a synchronizer ring of the synchronization unit according to FIGS. 1 to 5.
Figure 9:
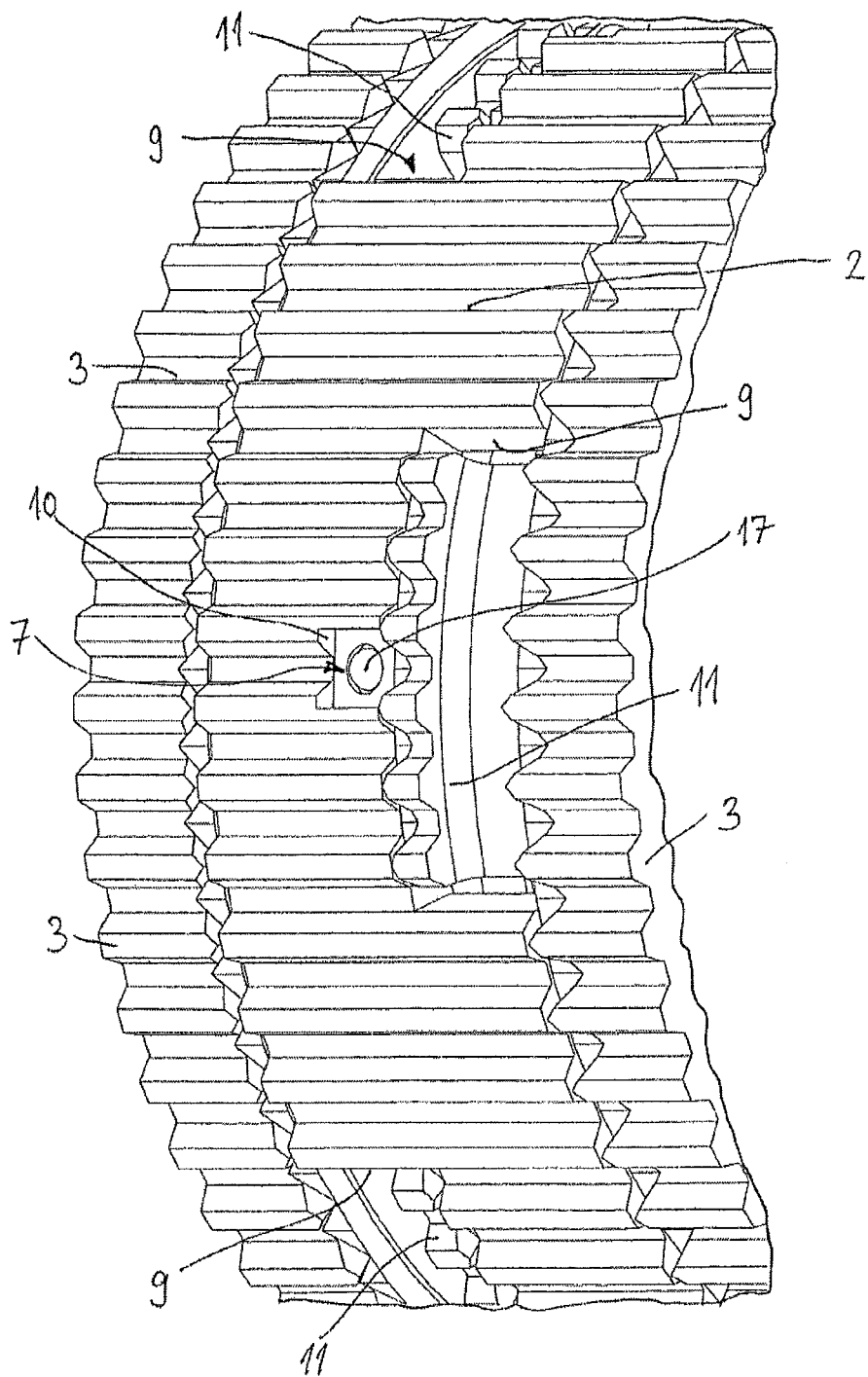
FIG. 9 shows a greatly enlarged illustration of a detail of the synchronization unit according to FIG. 3 without a selector sleeve.

The length of the toothing sections 11 in the circumferential direction is somewhat smaller than the circumferential length of the axial cutouts 9 of the sleeve carrier 2, as can be seen in FIGS. 3, 4 and 9. The thickness or axial extent of the external toothing systems 14 of the toothing sections 11 is smaller than an axial depth of the associated cutouts 9.

Figure 8:
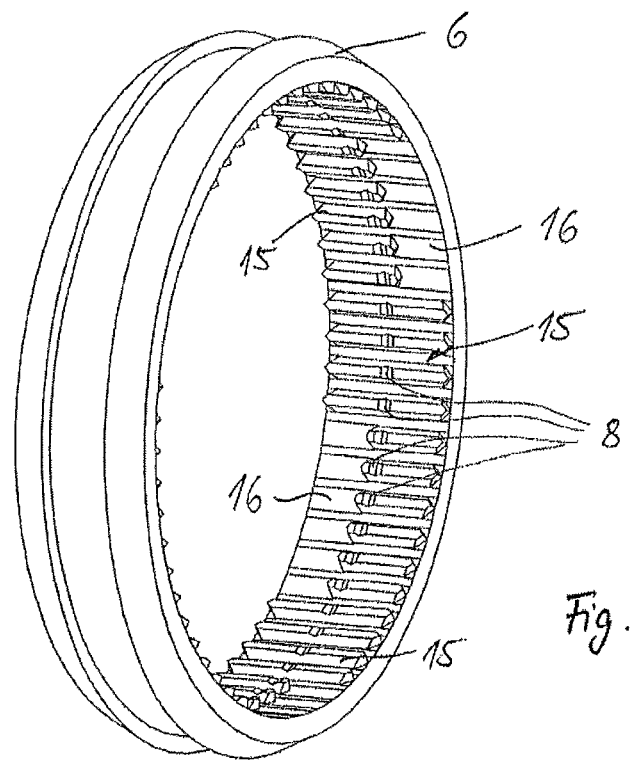
FIG. 8 shows the selector sleeve for the synchronization unit according to FIGS. 1 to 5.

After mounting of the synchronizer rings 4, the synchronizer rings therefore do not project axially beyond the sleeve carrier 2 in the region of the external toothing systems 14. The internal toothing systems 13, which are offset from the external toothing systems 14 both radially to the inside and axially or laterally, can project axially beyond the cutouts 9 if this is required. The internal toothing system 15 of the selector sleeve 6 is likewise provided with cutouts 16 at the level of the axial cutouts 9 and therefore at the level of the external toothing systems 14 of the toothing sections 11 of the synchronizer rings 4, in order for it to be possible to achieve the desired synchronization and shifting functions despite the synchronizer rings 4 which are integrated axially into the sleeve carrier 2. In FIG. 8, the circumferential groove 8 on the inside of the selector sleeve 6 can be seen, into which circumferential groove 8 the ball elements 17 of the pressure pieces 7 engage.

The function of the different elements of the dual clutch does not differ in principle from the function of known dual clutches. In the illustration according to FIGS. 1, 2 and 5, the selector sleeve 6 is situated in its neutral position, in which both multiple disk clutches 5 are ventilated and the sleeve carrier 2 rotates with its gear mechanism shaft 1A about rotational axis 1B independently of the speed gears and the associated clutch gears 3. As soon as the selector sleeve 6 is displaced axially from said neutral position, the circumferential groove 8 drives the corresponding pressure pieces 7 in the sleeve carrier 2 axially via the ball elements 17, as a result of which they exert an axial pressure force on the carrier ring 12 of the corresponding synchronizer ring 4. At the same time, corresponding end sections of the internal toothing system 15 of the selector sleeve 6 (which taper acutely in a wedge-shaped manner) come into contact with corresponding end sides of the external toothing systems 14 of the toothing sections 11 and press the latter positively into an axially aligned orientation. At the same time, a frictional connection to the adjacent clutch gear 3 is built up via the corresponding multiple disk assembly by the axial displacement of the synchronizer ring 4. As soon as the rotational speeds of the clutch gear 3 and of the sleeve carrier 2 are equalized via the corresponding multiple disk clutch 5, the selector sleeve 6 is displaced completely into its shifting position, with the result that it engages axially over the corresponding clutch gear 3 (see the illustration in FIG. 4). The shifting operation is therefore ended. During this axial displacement of the selector sleeve 6, each ball segment 17 of the respective pressure pieces 10 is pressed out of the inner circumferential groove 8 of the selector sleeve 6 counter to the pressure force of the inner compression spring. A renewed return of the selector sleeve 6 into the neutral position is possible by simple axial displacement, since the clutch gear 3, the associated synchronizer ring 4 and the sleeve carrier 2 are held by the selector sleeve 6 in a rotationally fixed manner and such that they are aligned axially with their toothing systems. Here, the pressure pieces 7 are retracted again by the ball elements 17 sliding into the circumferential groove 8 again during a corresponding axial return movement of the selector sleeve 6 being moved back positively axially into the neutral position.

The invention claimed is:

1. A synchronization unit for a positive dual clutch, said synchronization unit comprising:
a sleeve carrier connected for rotation with, and being axially fixed to, a working shaft, said sleeve carrier defining a rotational axis and having first and second sides facing in axial directions away from one another, respectively, said sleeve carrier including a plurality of first circumferentially-extending cutout sections which are indented in the axial direction and disposed adjacent said first side and a plurality of second circumferentially-extending cutout sections which are indented in the axial direction and disposed adjacent said second side;
a selector sleeve connected to said sleeve carrier for rotation therewith, said selector sleeve being axially displaceable relative to said sleeve carrier;

first and second frictionally-acting synchronizer clutches, said first synchronizer clutch being disposed adjacent said first side of said sleeve carrier and adjacent a first clutch gear, and said second synchronizer clutch being disposed adjacent said second side of said sleeve carrier and adjacent a second clutch gear, each said first and second synchronizer clutch having a multiple disc assembly and a synchronizer ring, said synchronizer ring of said first synchronizer clutch including a plurality of first toothed sections corresponding in number to said first cutout sections and said synchronizer ring of said second synchronizer clutch including a plurality of second toothed sections corresponding in number to said second cutout sections, each said first toothed section being axially and radially fitted within one corresponding first cutout section and each second toothed section being axially and radially fitted within one corresponding second cutout section; and a plurality of pressure pieces distributed over a circumference of said sleeve carrier and mounted in an axially adjustable manner thereon, said selector sleeve being disposed to cause axial adjustment of said pressure pieces in order to load one of said first and second synchronizer clutches.

2. The synchronization unit according to claim 1, wherein said first cutout sections are distributed over a circumference of said first side of said sleeve carrier and open sidewardly outwardly in the axial direction away from said second side of said sleeve carrier, and said second cutout sections are distributed over a circumference of said second side of said sleeve carrier and open sidewardly outwardly in the axial direction away from said first side of said sleeve carrier, said first and second cutout sections being distributed along said sleeve carrier in a circumferentially alternating manner with one another.

3. The synchronization unit according to claim 1, wherein each first toothed section is fitted within one corresponding first cutout section with play in a circumferential direction of said sleeve carrier, and each second toothed section is fitted within one corresponding second cutout section with play in the circumferential direction.

4. The synchronization unit according to claim 1, wherein each of said first and second toothed sections includes a plurality of teeth which extend in a direction substantially parallel with the rotational axis, said selector sleeve is annular and is disposed in surrounding relation with said sleeve carrier, said selector sleeve including an axially-oriented toothing arrangement disposed on a circumferential inner side of said selector sleeve adjacent said sleeve carrier, said toothing arrangement having a shape which is complementary to a shape of each of said first and second toothed sections of said first and second synchronizer rings, respectively, and said selector sleeve includes a plurality of recessed regions disposed adjacent said first and second toothed sections of said first and second synchronizer rings, respectively.

5. The synchronization unit according to claim 4, wherein said recessed regions are disposed radially adjacent said first and second cutout sections of said sleeve carrier.

6. The synchronization unit according to claim 5, wherein said selector sleeve has first and second sides facing in axial directions away from one another, respectively, said plurality of recessed regions including a plurality of first recessed regions distributed over an inner circumference of said first side of said selector sleeve and opening sidewardly outwardly in the axial direction away from said second side of said selector sleeve, and a plurality of second recessed regions distributed over an inner circumference of said second side of said selector sleeve and opening sidewardly outwardly in the axial direction away from said first side of said selector sleeve, said first and second recessed regions being distributed along said selector sleeve in a circumferentially alternating manner with one another.

7. The synchronization unit according to claim 1, wherein said selector sleeve is annular and is disposed in surrounding relation with said sleeve carrier, said selector sleeve including a plurality of axially-oriented toothing sections and a plurality of recessed regions disposed on an inner side of said selector sleeve adjacent said sleeve carrier, said sleeve carrier including a plurality of axially-oriented toothing sections disposed on an outer side of said sleeve carrier for engagement with said toothing sections of said selector sleeve, at least some of said toothing sections of said selector sleeve are respectively disposed circumferentially between two circumferentially adjacent ones of said recessed regions and extend over an entire axial extent of said selector sleeve, and at least some of said toothing sections of said sleeve carrier are respectively disposed circumferentially between two circumferentially adjacent ones of said first and second cutout sections of said sleeve carrier and extend over an entire axial extent of said sleeve carrier.

8. The synchronization unit according to claim 1, wherein each said pressure piece is disposed axially adjacent one of said first and second cutout sections.

\* \* \* \* \*